Aug. 12, 1952
F. M. YOUNG
2,606,673
APPARATUS FOR TRANSPORTING AND INSTALLING PORTABLE TANKS
Filed Aug. 26, 1946
2 SHEETS—SHEET 1
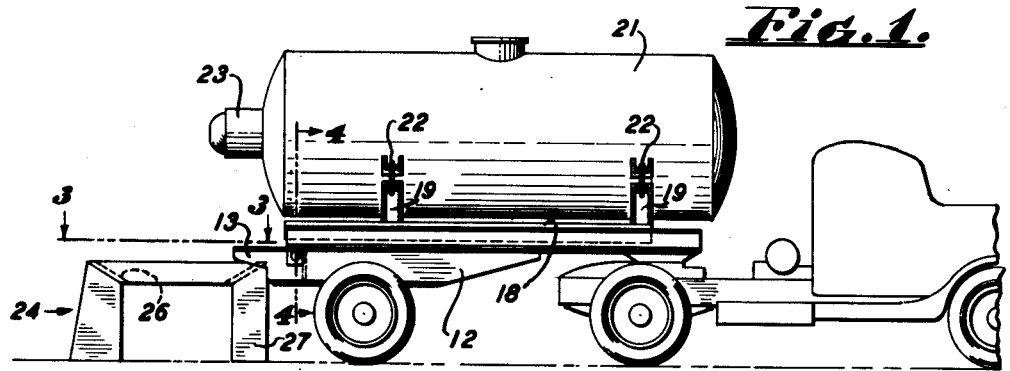
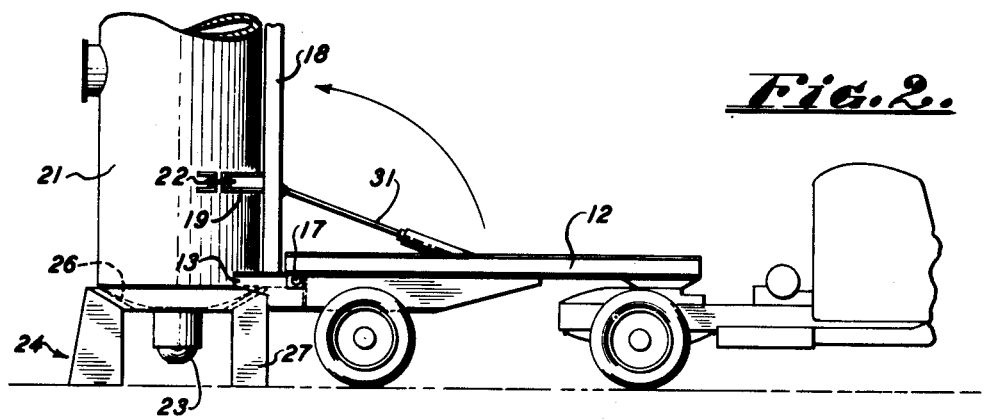
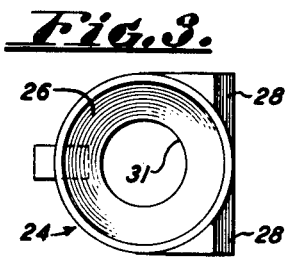
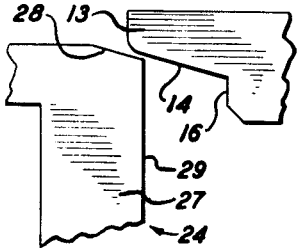
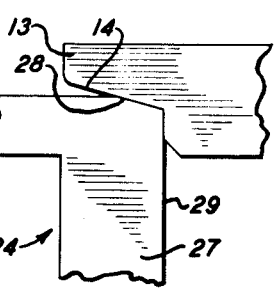
INVENTOR
FLETCHER M. YOUNG
BY
*M. C. Hayes*
ATTORNEY Aug. 12, 1952 — F. M. YOUNG — 2,606,673
APPARATUS FOR TRANSPORTING AND INSTALLING PORTABLE TANKS
Filed Aug. 26, 1948 — 2 SHEETS—SHEET 2
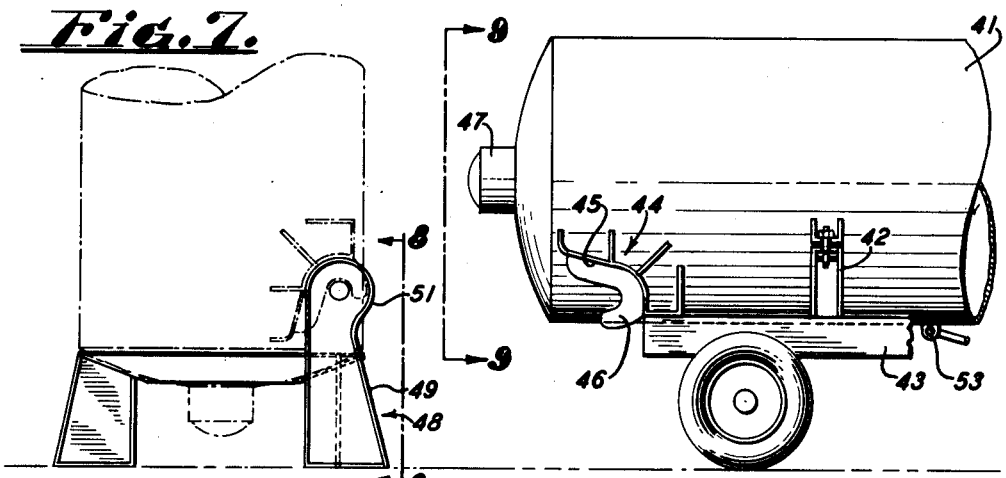
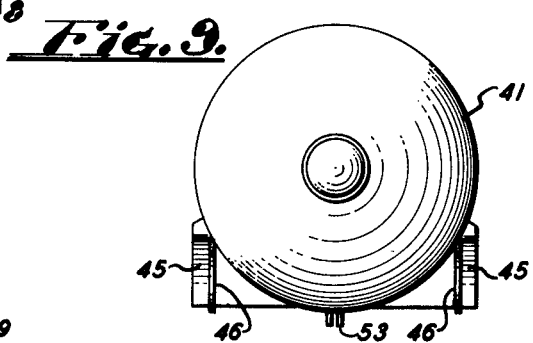
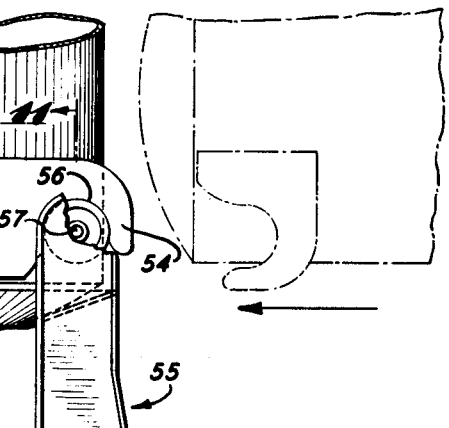
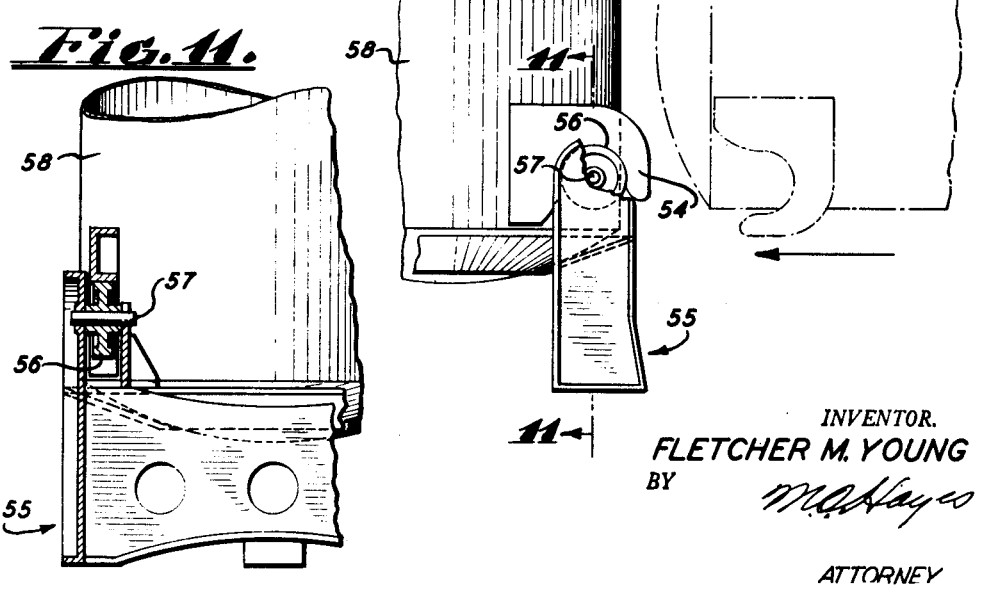
INVENTOR.
FLETCHER M. YOUNG
BY
ATTORNEY

UNITED STATES PATENT OFFICE 2,606,673

APPARATUS FOR TRANSPORTING AND INSTALLING PORTABLE TANKS

Fletcher M. Young, Long Beach, Calif.

Application August 26, 1948, Serial No. 46,346

5 Claims. (Cl. 214—38)

(Granted under the act of March 3, 1883, as amended April 30, 1928; 370 O. G. 757)

This invention relates to load receiving and transferring apparatus and more particularly to apparatus for transferring a tank from a truck to a stationary pedestal for storage and dispensing purposes.

Heretofore in delivering bulk materials which are normally transported in tanks or similar containers, it was necessary to pump the material from the tank or container to the place of storage. This operation unnecessarily wastes time of personnel and equipment.

It is an object of this invention to provide apparatus whereby this unnecessary waste of time will be eliminated.

It is another object of this invention to provide load transferring and receiving apparatus whereby products which are now delivered in small containers or by pumping from tank to truck may be delivered in bulk.

Another object of this invention is to provide load receiving and transferring apparatus which facilitates convenient and appropriate storage at the place of use.

A further object of this invention is to provide load receiving and transferring apparatus to make possible bulk delivery of many products which, because of hazard during pumping transfer, do not lend themselves to bulk delivery.

A further object of this invention is to provide load receiving and transferring apparatus which makes possible a saving in time both for the consumer and the vendor of bulk liquid products.

A still further object of this invention is to provide load receiving and transferring apparatus which is simple in operation and economical in construction.

An additional object of this invention is to provide load receiving and transferring apparatus which eliminates overstressing and breaking of truck springs and axles during transfer of loads from truck to standard.

Other objects and many of the attendant advantages of this invention will be readily appreciated as the same becomes better understood by reference to the following description.

The apparatus of the invention comprises generally a truck, a tank carried thereby, and a stationary pedestal adapted to receive and support the tank. The tank is tipped from the truck onto the pedestal by suitable power means on the truck. During the tipping operation the bulk of the weight of the tank is taken by the pedestal legs, thereby relieving the rear wheel assembly of the truck of the excess load that would otherwise be experienced. After the tank has been firmly seated on the pedestal, the connections between the tank and the truck are severed and the latter is free to depart for other hauling.

Several embodiments of the instant invention have been illustrated in the accompanying drawings, wherein:

Fig. 1 is a side view of the instant invention showing the truck in engagement with the pedestal with the tank ready to be tilted onto the pedestal;

Fig. 2 is a side view of the instant invention showing the tank in its seated position on the pedestal;

Fig. 3 is a top view of the pedestal alone taken on line 3—3 of Fig. 1;

Fig. 4 is a partial cross section of the truck, bed, saddles and tank taken on line 4—4 of Fig. 1;

Fig. 5 is a partial view of the wedges about to engage the inclined surfaces of the leg members;

Fig. 6 is a partial view of the wedges in full engagement and stopped in position;

Fig. 7 is a partial side view of a modification of the instant invention showing the truck backing toward the pedestal;

Fig. 8 is a front view of the pedestal, showing the trunnion members, taken on line 8—8 of Fig. 7;

Fig. 9 is a front view of the tank alone, taken on line 9—9 of Fig. 7 and showing the pivot guides;

Fig. 10 is a partial side view of a second modification of the instant invention showing the tank seated on the pedestal; and Fig. 11 is a partial front section of the tank and pedestal taken on line 11—11 of Fig. 10.

Referring to Fig. 1 of the drawings, 12 designates a truck terminating at its rear in a pair of wedges 13, having inclined surfaces 14 (Figs. 5 and 6) facing the ground, and stop walls 16, provided at the bases of the wedges 13. A pivot shaft 17, transversely mounted on the truck 12, serves as a pivot for the rearward tilting of a bed 18, seated on the truck. A pair of tank saddles 19, secured to the bed 18, serve to cradle a tank 21, which is secured thereto by means of eyebolts 22. The tank 21 has a discharge dome 23, projecting rearward of the truck.

Numeral 24 designates a pedestal which serves to seat the tank 21 and to support the weight of the tank while it is being transferred from the truck 12. The pedestal includes an annular concave seat 26 supported by leg members, two of which, 27, have on their top surfaces inclined planes 28 disposed to engage the wedges 13 upon backing of the truck 12 toward the pedestal 24. The forward faces 29 of the legs 27 abut the stop walls 16 of the wedges 13 and thereby assure predetermined positioning of the truck 12 relative to the pedestal 24. A circular opening 31 at the center of the concave seat 26 permits clearance for the dome 23 of the tank 21 upon seating. Tilting of the bed and tank is accomplished by a ram type hoist 31, or other suitable mechanism.

*Operation*

In operation, the truck 12, carrying a tank 21, is backed toward the pedestal 24 until the wedges 13 of the truck engage the inclined planes 28 at the top of the leg members 27. The pedestal 24 is so constructed that complete engagement between the wedges 13 and the inclined planes 28 forces the rear of the truck to rise (Figs. 5 and 6), thus relieving the rear springs, axles, and wheels of the truck of a substantial portion of the load, and also, because the rear of the truck is maintained level and stable, prohibiting lateral tilting of the tank while it is being transferred to the pedestal. The engagement of the wedges 13 and the inclined planes 28, limited by the abutment of the stop walls 16 against the forward faces 29 of the legs 27, places the apparatus in position for transfer of the tank 21 from the truck to the pedestal.

To effect the transfer, the ram hoist 31 is utilized to tilt the tank 21 and bed 18 assembly into a vertical position, the shaft 17 serving as a pivot. In this position the tank is seated directly upon the annular concave seat 26 of the pedestal, with the discharge dome 23 extending through the circular clearance opening 31. The tank is then unfastened from the saddles 19 by loosening the eyebolts 22, and the truck can be driven away from the pedestal, leaving the tank seated in position. At the option of the operator, the tilt bed 18 can be left attached to the tank by removal of the pivot shaft 17.

When it is desired to remove a tank 21 from the pedestal 24, an empty truck 12 is backed into engagement with the pedestal 24, with the bed 18 in elevated position, the tank is fastened to the saddles 19 by means of the eyebolts 22, and the bed 18 is lowered from the upright position to the horizontal position onto the truck 12 by the retraction of the hoist 31. The truck can then be driven away from the pedestal leaving it ready to receive another tank.

The modified form of the invention illustrated in Figs. 7, 8, and 9 eliminates the tilt bed of the apparatus. The tank 41 is seated in saddles 42 directly on the truck 43 and is fastened thereto by means of eyebolts. A pair of pivot guides 44 are secured to the bottom and rear of the tank 41. The pivot guides have guiding surfaces 45 and also have a pair of hook members 46, which are adjacent to and have a common center with the guiding surfaces 45. The tank is provided with a discharge dome 47 projecting rearwardly of the truck.

The pedestal 48, which receives and seats the tank 41, is like the pedestal 24 of the hereinbefore described embodiment except that the supporting leg member 49 terminates at the top in trunnions 51, on which the guiding surfaces 45 of the pivot guides 44 bear during the tilting of the tank. The leg members 49 are also provided with a pair of aligned stub shafts 52, which have a common center with the trunnions 51, and which are positioned to coact with the hook members 46 of the tank 41 upon backing of the truck toward the pedestal. The hook members 46 thereby prevent accidental slipping of the tank 41 from the trunnions 51 during tilting.

The operation of this modification is quite similar to that of the first embodiment. The truck carrying the tank 41 is backed toward the pedestal until the pivot guides 44 engage the trunnions 51. The hook members 46 are now in location to act as a safeguard against overriding of the trunnions 51 by the guiding surfaces 45, should the truck 43 be backed too hard against the pedestal 48. By virtue of their position between the trunnions 51, the hook members 46 also act as stops to prevent lateral slipping of the guiding surfaces 45 from the trunnions 51.

After the truck is in position, the eyebolts holding the tank 41 to the saddles are loosened. By means of a ram type hoist linked to the tank by a suitable link 53, the tank is tilted about the axis of the trunnions 51 to its seated position on the pedestal 48. When the hoist is unlinked from the tank there are no further connections between the truck and the tank, and the truck can be driven away. Removal of a tank is effected in a manner similar to that described in the first embodiment.

Another modified form of the invention is illustrated in Figs. 10 and 11. This form is like the modification described immediately above, except that the guiding surfaces 45 and the hook members 46 are made integral in the form of brackets 54. The trunnion 51 and stub shafts 52 of the Fig. 8 modification are changed to wheels 56, pivoted on shafts 57, secured to the pedestal 55, and of such size as to be embraced by brackets 54 to form therewith a pivotal coupling between the tank and the pedestal during the time while the tank is being up-ended. The wheels 56 assume the double function of pivoting the tank 58 and of preventing accidental overriding of the tank during the tilting. This modification operates in substantially the same manner as the first.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Load receiving and transferring apparatus comprising a truck including a bed and a load of elongated form carried thereon in horizontal position, a stationary pedestal adapted to receive said load in vertical position, supporting members on said pedestal adapted to support said load during transfer of said load from said bed to said pedestal, engaging members on said load at the rear thereof effective to engage said supporting members upon backing of said truck toward said pedestal, thereby to assume the weight of said load during said transfer, and means for tilting said load from said bed onto said pedestal.

2. Load receiving and transferring apparatus comprising a truck including a bed and a load of elongated form carried thereon in horizontal position, a stationary pedestal adapted to receive said load in vertical position, supporting members adapted to support said load during transfer of said load from said bed to said pedestal, engaging members on said load at the rear thereof effective to engage said supporting members upon backing of said truck toward said pedestal, thereby to assume the weight of said load during said transfer, and means for tilting said load from said bed onto said pedestal.

3. Load receiving and transferring apparatus comprising a vehicle including a bed and a load of cylindrical form carried thereon in horizontal position, a stationary pedestal adapted to receive said load in vertical position, supporting members on said pedestal adapted to support said load during transfer of said load from said bed to said pedestal, engaging members on said load effective to engage said supporting members upon juxtaposition of said vehicle adjacent said pedestal, thereby to assume the weight of said load during said transfer, and means for tilting said load from said bed onto said pedestal.

4. Load receiving and transferring apparatus comprising a vehicle including a bed and a cylindrical tank carried thereon in horizontal position, a stationary pedestal adapted to receive said tank in vertical position, supporting members adapted to support said tank during transfer of said tank from said bed to said pedestal, engaging members on said tank effective to engage said supporting members upon juxtaposition of said vehicle adjacent said pedestal, thereby to assume the weight of said tank during said transfer, and means for tilting said load from said bed onto said pedestal.

5. Material handling apparatus comprising a cylindrical container adapted to be transported in horizontal position on a vehicle, a stationary pedestal shaped to support the container in up-ended position, spaced parallel wheels on said pedestal, and parallel brackets fixed to the container adjacent the lower rear end thereof and positioned to engage said wheels when the vehicle is backed into proximity to the pedestal to form a pivotal coupling between the container and the pedestal during up-ending.

FLETCHER M. YOUNG.

REFERENCES CITED

The following references are of record in the file of this patent:

UNITED STATES PATENTS

| Number | Name | Date |
|---|---|---|
| 1,379,472 | Morgan et al. | May 24, 1921 |
| 1,785,168 | Young | Dec. 16, 1930 |
| 1,901,482 | Von Der Horst | Mar. 14, 1933 |
| 2,189,052 | Anthony | Feb. 6, 1940 |
| 2,201,920 | Pugh | May 21, 1940 |
| 2,233,005 | Garlinghouse | Feb. 25, 1941 |
| 2,313,335 | Godfrey | Mar. 9, 1943 |